Patented Nov. 24, 1953

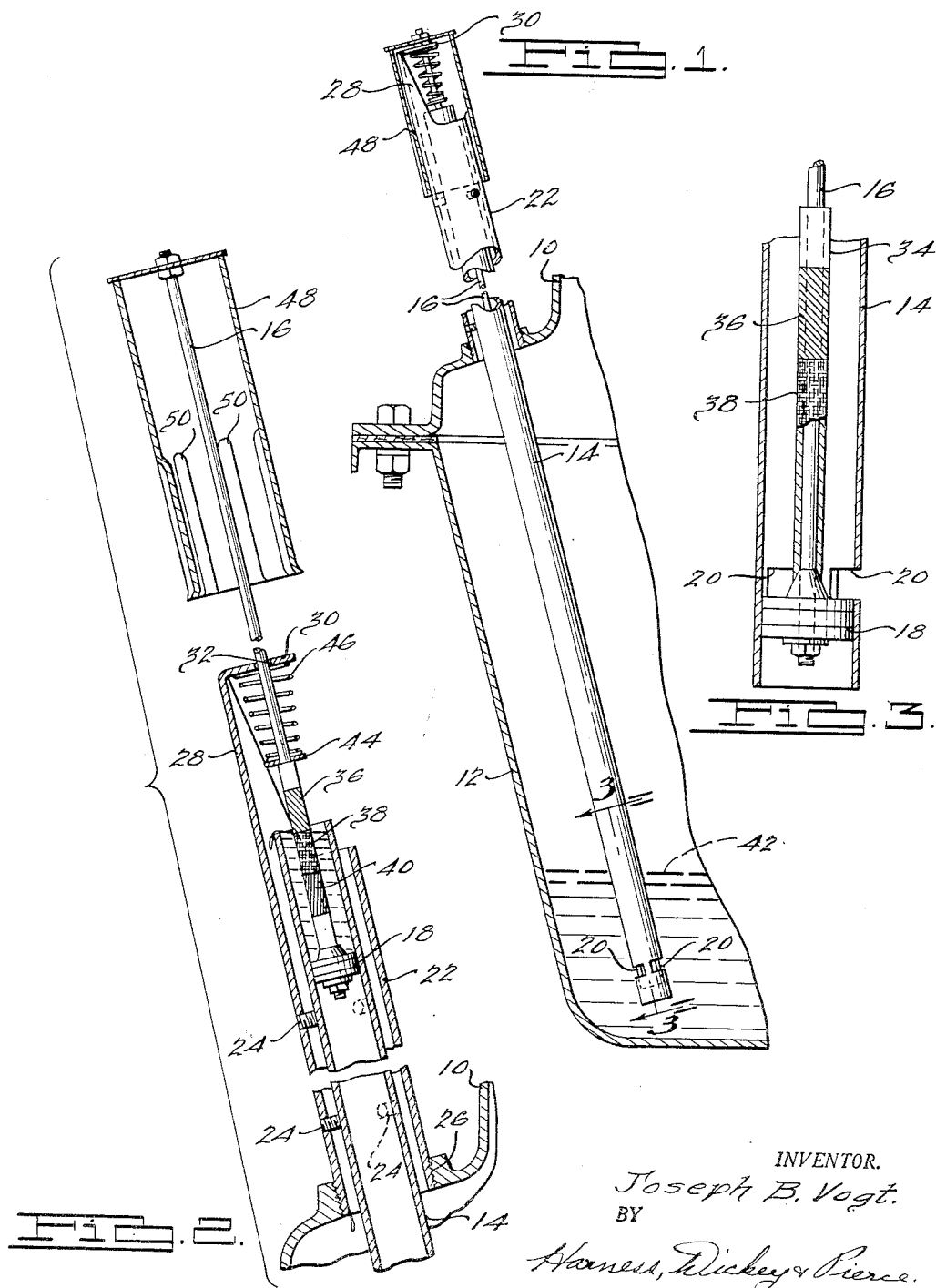

2,660,058

UNITED STATES PATENT OFFICE 2,660,058

LIQUID LEVEL INDICATOR

Joseph B. Vogt, Grosse Pointe Park, Mich.

Application March 10, 1952, Serial No. 275,778

11 Claims. (Cl. 73—290)

The present invention relates to an improved liquid level indicator.

It is an object of the present invention to provide an improved liquid level indicator which is simple in construction, reliable and efficient in operation and which eliminates the need for wiping off a rod or stick inserted into the liquid.

It is also an object of the present invention to provide an improved liquid level indicator of the type in which no part is completely removed from the container for the liquid and which accordingly, eliminates the difficulty frequently encountered in returning liquid level indicators of the conventional dip stick type into the aperture from which they are withdrawn.

Other and more detailed objects of the invention will be apparent from a consideration of the following specification, the appended claims and the accompanying drawing wherein:

Figure 1 is a broken view partially in elevation and partially in section of a liquid level indicator embodying the present invention, showing the parts thereof in the normal rest or nonuse position;

Figure 2 is a transverse sectional view of the construction illustrated in Figure 1, showing the parts in the position assumed during use for observing the liquid level; and, Figure 3 is an enlarged sectional view of the structure illustrated in Figure 1, taken substantially along the line 3—3 thereof.

It will be appreciated from a complete understanding of the present invention that the improvements thereof may be readily embodied in liquid level indicators of a wide variety of types and adapted for various different uses. In an illustrative but not a limiting sense, the improvements of the present invention herein illustrated and described are embodied in a device for indicating the level of the lubricating oil in the crankcase of an internal engine.

Referring to the drawing, a fragmentary portion of an internal combustion engine is indicated at 10 and the crankcase thereof is indicated at 12. The liquid level indicator of the present invention generally comprises an elongated tube 14 in which is mounted a piston rod 16 carrying a piston 18 secured to its lower end and adapted to slidably fit the interior of the tube 14. The tube 14 is provided with a plurality of apertures 20 which are disposed to have a relatively small extent axially upwardly of the tube 14 from the normal and lowermost position of the piston 18, which position is illustrated in Figure 3. In the preferred embodiment illustrated the tube 14 is mounted in an outer tube or sleeve 22, the internal diameter of which is substantially larger than the external diameter of the tube 14 for a purpose hereinafter described. In the preferred embodiment illustrated the tube 14 is supported in coaxial relation with the sleeve 22 by means of two axially spaced groups of set screws 24 threadedly mounted in the sleeve 22 equiangularly spaced circumferentially thereof, and the inner ends of which engage the tube 14. The lower end of the sleeve 22 is externally threaded for engagement with the engine 10 as indicated at 26. It will be noted that the tube 14 and the sleeve 22 are supported by this threaded engagement in a position inclined to the vertical. The upper end of the sleeve 22 is formed as illustrated in Figures 1 and 2 to provide an upwardly extending trough portion 28 at the lower side of the sleeve which terminates at its upper end in an inwardly turned arm 30 having an aperture 32 slidably receiving the rod 16 and adapted to maintain the rod in coaxial relation with the tube 14. Below the inwardly turned arm 30, the trough portion 28 is adapted to receive any of the liquid drawn upwardly through the tube 14 by the piston 18 which flows from the upper end thereof, and direct such liquid downwardly through the sleeve 22 which communicates at its lower end with the crankcase 12 and because of the above described relative sizes of the sleeve 22 and tube 14, readily permits return of this liquid downwardly through the sleeve 22 around the tube 14 and to the crankcase 12.

It will be appreciated that in the broader aspects of the present invention any suitable indicia may be provided on the rod 16 for indicating the relative level of the liquid in the crankcase. In the preferred embodiment illustrated, a small sleeve 34 is mounted on the rod 16 in fixed relation thereto and extends upwardly from the piston 18. This sleeve 34 is provided with suitable indicia such, for example, as the three color zones 36, 38 and 40, which are marked to represent the colors green, yellow and red, respectively. The upper end of the sleeve 34 is substantially above the upper end of the green zone 36, the top of which corresponds to the full level of the oil 42, and is adapted to engage a washer 44 which encircles the rod 16 and is connected to one end of a spring 46, the other end of which is connected to the underside of the guide arm 30. In the preferred embodiment illustrated this spring 46 is of a conventional conical shape permitting a substantial axial collapse of the spring to permit the upward movement of the rod 16 required in observing the liquid level when it is in its lower ranges. The engagement of the upper end of the sleeve 34 with the washer 44 serves to warn the attendant that the rod 16 is approaching the position at which the liquid level may be observed. A cover 48 is secured to the upper end of the rod 16 and is adapted to slidably fit on the upper end of the sleeve 22 and enclose the trough extension 28 and arm 30, and prevent access of dirt or other foreign material to the upper ends of the tube 14 and the sleeve 22. In the preferred embodiment illustrated the cover 48 is provided with corrugations 50 which grip the sleeve 22 to provide a friction engagement therewith.

From the foregoing description of the improved liquid level indicator of the present invention it will be appreciated that when it is desired to determined the level of the liquid within the crankcase 12 it is only necessary for an attendant to grasp the cover 48 and move it upwardly to withdraw the rod 16 upwardly along the tube 14. Because of the disposition of the apertures 20 immediately adjacent the upper side of the piston 18, the initial movement of the piston upwardly prevents flow of the oil between the crankcase 12 and the portion of the tube 14 at the upper side of the piston 18 and continued upward movement of the rod 16 and piston 18 lifts a column of oil within the tube 14 upwardly along the tube 14 until the surface of this column of oil reaches the top of the tube 14. As this position is approached, the upper end of the sleeve 34 engages the washer 44 and the action of the spring 46 yieldably opposes continued upward movement of the rod 16 and warns the attendant that this position is being approached. When the surface of the oil in the tube 14 reaches the top of the tube 14 the attendant may observe the intersection of this surface with the indicia means carried by the rod 16 which in the embodiment illustrated are the three color zones 36, 38 and 40. Any oil flowing from the top of the tube 14 prior to return of the piston 18 and rod 16 downwardly to the position illustrated in Figure 1, is received in the trough portion 28 and directed downwardly through the sleeve 22 from which it returns to the crankcase 12.

It will be noted that in the position of nonuse illustrated in Figure 1, the upper end of the tube 14 is vented through the sleeve 22 to the portion of the crankcase 12 above the oil 42 and in the construction illustrated is also vented directly to atmosphere by the spaces provided between the corrugations 50.

From the foregoing it will be readily appreciated that the present invention eliminates the necessity for removing any part of the liquid level indicator from the engine and wiping it, and again inserting it into an aperture from which it has been removed.

While only one specific embodiment of the present invention has been illustrated and described herein in detail, it will be readily appreciated by those skilled in the art that numerous modifications and changes may be made without departing from the spirit of the present invention.

What is claimed is:

1. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, and indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed.

2. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and means connected to said tube for receiving any liquid which flows from the upper end of the tube during the upward movement of the piston and returning such liquid to said container.

3. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and cover means shielding the upper end of said tube and venting said tube at the upper side of said piston to a source of fluid pressure substantially equal to the fluid pressure within said container above the liquid therein.

4. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and means effective upon withdrawal of said piston rod upwardly along said tube to indicate the approach of the rod toward the position at which the intersection of the surface of the liquid within the tube with said indicia means may be observed.

5. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and cooperating means connected to said rod and said tube effective upon withdrawal of said piston rod upwardly along said tube to oppose continued upward movement of said rod to indicate the approach of said rod toward the position at which the intersection of the surface of the liquid in said tube with said indicia means may be observed.

6. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and guide means connected to said tube and slidably engaging said rod beyond the upper end of said tube for maintaining said rod in coaxial relation with said tube.

7. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and an outer sleeve surrounding the upper portion of said tube and having an internal diameter greater than the external diameter of said tube, said sleeve being adapted to receive any of said liquid which may flow from the upper end of said tube and return said liquid to said container.

8. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and an outer sleeve surrounding the upper portion of said tube and having an internal diameter greater than the external diameter of said tube, said sleeve being adapted to receive any of said liquid which may flow from the upper end of said tube and return said liquid to said container, said tube and said sleeve being inclined relative to the vertical and said sleeve having an upwardly extending portion at its lower side providing a trough adapted to catch any of said liquid which may flow from the upper end of said tube and direct it downwardly through said sleeve.

9. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and an outer sleeve surrounding the upper portion of said tube and having an internal diameter greater than the external diameter of said tube, said sleeve being adapted to receive any of said liquid which may flow from the upper end of said tube and return said liquid to said container, said tube and said sleeve being inclined relative to the vertical and said sleeve having an upwardly extending portion at its lower side providing a trough adapted to catch any of said liquid which may flow from the upper end of said tube and direct it downwardly through said sleeve, said upwardly extending portion terminating in an inwardly turned guide arm apertured to slidably receive said rod and maintain said rod in coaxial relation with said tube.

10. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, an outer sleeve surrounding the upper portion of said tube and having an internal diameter greater than the external diameter of said tube, said sleeve being adapted to receive any of said liquid which may flow from the upper end of said tube and return said liquid to said container, said tube and said sleeve being inclined relative to the vertical and said sleeve having an upwardly extending portion at its lower side providing a trough adapted to catch any of said liquid which may flow from the upper end of said tube and direct it downwardly through said sleeve, said upwardly extending portion terminating in an inwardly turned guide arm apertured to slidably receive said rod and maintain said rod in coaxial relation with said tube, a spring connected to said arm and extending downwardly therefrom in encircling relation with said rod, a washer connected to the lower end of said spring and slidably along said rod, and means on said rod adapted to engage said washer as said rod approaches said position in which the intersection of the surface of the liquid in said tube with said indicia means may be observed whereby said spring opposes continued upward movement of said rod.

11. A liquid level indicator for a container, said indicator comprising a tube adapted to be mounted on said container in fixed relation thereto and extend into said container to a point below the lowest liquid level to be indicated, a piston rod extending from the outer end of said tube and movable longitudinally thereof, a piston slidably fitting in said tube mounted on said rod and movable thereby to and from a position below said lowest liquid level, said tube having an open upper end and an aperture disposed below said lowest liquid level to be indicated and above said piston when the latter is in said position, indicia means on said piston rod disposed at predetermined levels of the liquid when said piston is in said position whereby the level of the liquid in said container may be readily determined by drawing the piston rod upwardly in said tube to a point at which the intersection of the surface of the liquid in the tube with said means may be observed, and an outer sleeve surrounding the upper portion of said tube and having an internal diameter greater than the external diameter of said tube, said sleeve being adapted to receive any of said liquid which may flow from the upper end of said tube and return said liquid to said container, said sleeve having an upwardly extending inwardly turned arm defining a guide slidably engaging said rod to maintain said rod in coaxial relation with said tube, a cover carried on the upper end of said rod fitting said sleeve adapted to engage said arm to prevent movement of said rod to move said piston downwardly of said tube beyond said position, said aperture being disposed adjacent said position of said piston so that a relatively small upward movement of said piston moves said piston to prevent flow of fluid between said container and the portion of said tube at the upper side of said piston.

JOSEPH B. VOGT.

References Cited in the file of this patent

UNITED STATES PATENTS

| Number | Name | Date |
|---|---|---|
| 1,558,240 | Crawford | Oct. 20, 1925 |
| 2,159,275 | Kinney | May 23, 1939 |
| 2,587,526 | Quist | Feb. 26, 1952 |

FOREIGN PATENTS

| Number | Country | Date |
|---|---|---|
| 853,853 | France | Dec. 16, 1939 |